H. HELLBERG.
POCKET SEAL PRESS.
APPLICATION FILED JULY 26, 1920.
1,365,401.
Patented Jan. 11, 1921.
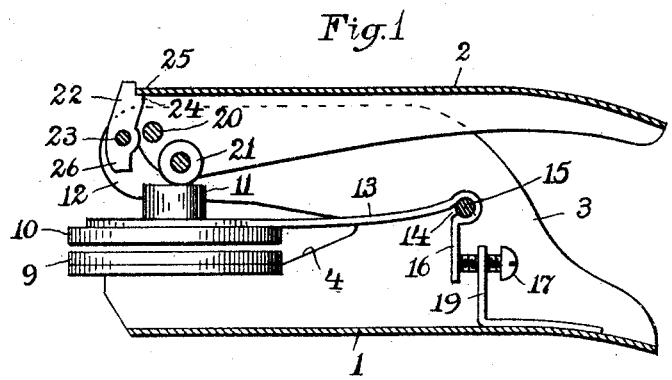
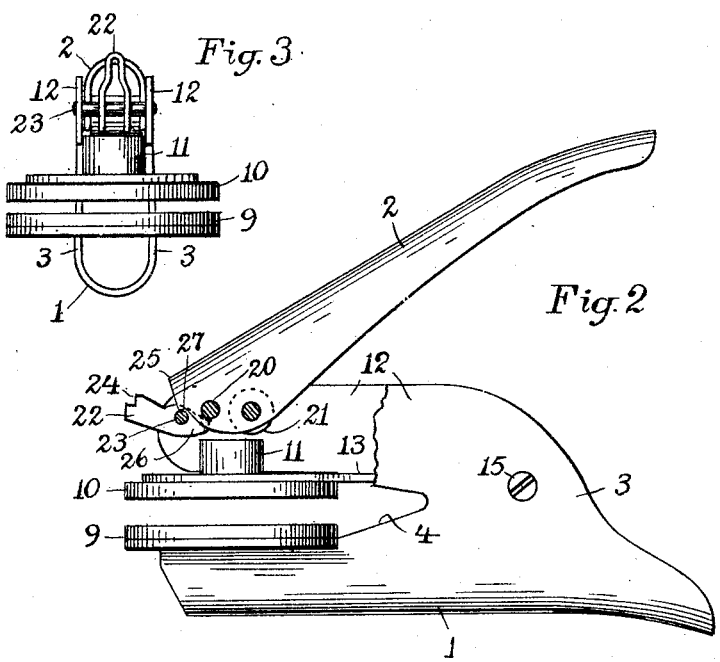
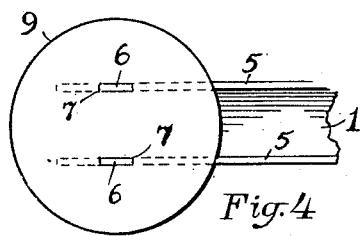
Inventor,
Harold Hellberg;
By A. B. Upham,
Attorney.

UNITED STATES PATENT OFFICE.

HAROLD HELLBERG, OF QUINCY, MASSACHUSETTS.

POCKET SEAL-PRESS.

1,365,401. Specification of Letters Patent. Patented Jan. 11, 1921.

Application filed July 26, 1920. Serial No. 399,050.

*To all whom it may concern:*

Be it known that I, HAROLD HELLBERG, a citizen of the United States, and a resident of Quincy, in the county of Norfolk and Commonwealth of Massachusetts, have invented certain new and useful Improvements in Pocket Seal-Presses, of which the following is a full, clear, and exact specification.

The object of this invention is the construction of a compact and light seal press capable of being carried in the pocket, and which shall possess the following improvements: A better means for locking the seal-operating handle in a closed position; for governing the movable member of the seal; for resiliently holding the same, and for attaching the fixed member of the seal in place.

In the drawings, Figure 1 is a side sectional elevation of a seal embodying my improvements, the handle being illustrated as closed. Fig. 2 is a side elevation of the same but with a part thereof broken away and the handle raised. Fig. 3 is an end view of the seal press. Fig. 4 is a plan view of the stationary seal-member.

The body 1 of the press and the operative handle 2 of the same are each formed from sheet steel bent over into a more or less deep U. Each of the two side portions 3 of the body is formed with a deep notch 4, the forward part of each lower edge 5 being provided with a lug 6 adapted to enter a slot 7 in the stationary seal member 9, as shown in Fig. 4, and to be upset therein for fastening this member firmly in place.

The movable seal member 10 is provided with a hub 11 fitting between the arms 12 of the body 1, and is given a resilient upward pressure by means of a leaf spring 13 attached thereto. At the other end of this spring is an eye 14 through which passes a rivet or screw 15, and an arm 16 against which a set screw 17 abuts, the set screw being supported in any suitable way, as by an elbow 19 attached to the body by brazing or otherwise.

In removing the spring arm 13 and the seal member 10, it is well first to unloosen the set screw 17 and then to withdraw the screw 15, after which said parts can be easily withdrawn. These parts are returned in a reverse order, the set screw 17 being forced against the arm or elbow 16 after the screw 15 has been introduced through the eye 14, until the movable seal member 10 is pressed away from the stationary seal member 9 with the proper force to insure its instant release of the paper which has been impressed thereby.

The handle 2 is pivoted between the forward ends of the arms 12 upon a rivet 20, and carries an anti-friction roll 21 adapted for engagement with the end of the hub 11. Upon swinging the handle 2 upward, the spring 13 causes the movable seal member 10 to rise with it, and by forcing the handle downward, the movable member is pressed down until it impresses the paper introduced between it and the stationary member 9.

For holding the handle 2 in a substantially closed position in order that the seal press may be conveniently put in one's pocket or in any other restricted place of storage, I provide a detent 22 pivotally supported upon a pin 23 and having a shoulder 24 designed to be introduced beneath the end 25 of the handle, as shown in Fig. 1, and thereby retaining the handle in the position desired. By slightly depressing the handle, the detent can be instantly swept out of the way of the edge 25, and the handle permitted to rise to its normal elevated position, the tail 26 of the detent meeting the pivot 20 and thereby kept from falling into interference with the movable seal member 10. A shoulder 27 at the end of the handle, as shown in Fig. 2, serves by its engagement with the pin 23 to prevent the handle from rising above a desired height.

Thus made, the seal press is light, easily locked for putting in a small compass and as easily unlocked for use, and when in use there is no danger of the detent's getting in the way of the movable seal member 10, or of accidentally locking the handle against rising. Further, the fit of the hub 11 between the two arms 12 retains the movable seal member 10 from lateral displacement, thus acting in conjunction with the leaf spring 13 which insures against longitudinal displacement, to insure the accurate engagement of the two seal members and a consequent clear impression and an avoidance of cutting the paper being sealed.

What I claim is:

1. A seal press comprising a body having spaced parallel sides, a stationary seal member, a movable seal member, a leaf spring carrying the movable seal member at one end and having an eye at its other end, a pivot disposed in said eye supported by said sides, the spring having an arm depending therefrom at said eye, and a set screw disposed for acting against said arm for increasing the upward pressure of the spring.

2. A seal press comprising a body having spaced sides, a stationary seal member supported by said body, a movable seal member, a pivoted handle for actuating the movable seal member, the handle having a short end extending beyond its pivotal support, and a detent pivotally supported by said body sides in front of the handle pivot and adapted when the handle is in its depressed position to be entered beneath said short extended end for preventing the handle's elevation.

3. A seal press comprising a body having spaced parallel sides, a stationary seal member supported by said sides, a movable seal member, a handle composed of sheet metal doubled transversely, a pin pivotally supporting said handle, said pin being terminally held by said sides and spaced from the short end of the handle, a pivot pin held by said sides spaced in front of the first-named pin, and a detent having a shoulder and a tail at opposite ends, said shoulder being adapted for engagement with the interior of said short end for locking the handle against elevation, and said tail being adapted for engagement with the first-named pivot pin for retaining it out of interference with the said movable seal member, the latter being adapted to be pressed against the stationary member by the forcible depression of the handle.

4. A seal press comprising a body having sides, a stationary seal member supported by said sides, a movable seal member, a handle for actuating the latter, a pivot pin for said handle spaced from its short end and terminally supported by said sides, a pivot pin terminally supported by said sides close in front of said short end, and a detent pivotally supported on the last-named pivot pin and adapted to be engaged with the short end of the handle for holding it from elevation, said short end having a shoulder adapted to engage the last-named pivot pin for preventing it from rising too high.

In testimony that I claim the foregoing invention, I have hereunto set my hand this 23rd day of July, 1920.

HAROLD HELLBERG.